United States Patent [19]

Gardner

[11] Patent Number: 4,755,908
[45] Date of Patent: Jul. 5, 1988

[54] CAPACITOR

[76] Inventor: Edward P. Gardner, 4595 Laguna Pl., #335, Boulder, Colo. 80303

[21] Appl. No.: 86,328

[22] Filed: Aug. 17, 1987

[51] Int. Cl.$^4$ .............................................. H01G 4/02
[52] U.S. Cl. .................................. 361/326; 220/2.1 R
[58] Field of Search ........................ 333/181; 361/326; 362/182, 363, 809; 220/2.1 R

[56]     References Cited
U.S. PATENT DOCUMENTS

| 1,886,180 | 11/1932 | Green ................................... 333/181 |
| 2,625,671 | 1/1953 | Krefft .......................... 220/2.1 R X |
| 2,719,098 | 9/1955 | Goldman ......................... 220/2.1 R |

FOREIGN PATENT DOCUMENTS

| 3041397 | 6/1982 | Fed. Rep. of Germany ... 220/2.1 R |
| 73940 | 6/1977 | Japan ............................... 220/2.1 R |

*Primary Examiner*—Donald A. Griffin
*Attorney, Agent, or Firm*—Duane Burton

[57]                ABSTRACT

A capacitor comprising a sealed hollow glass container, inductor means, a portion of which is mounted within said sealed glass container, two or more layers of material deposited on the exposed surfaces contained within the sealed glass container and a gaseous mixture filling said sealed glass container having a pressure, at 25° C., of approximately 100 torr or more, the gases in said mixture being selected from a group of gases consisting of helium, neon, argon, krypton and xenon. The amounts of argon, neon and xenon do not, individually, exceed approximately 50%, by volume, of the total volume of said gaseous mixture. The amount of helium varies from approximately 10% to 90%, by volume, of the total volume of said gaseous mixture and the amount of krypton does not exceed approximately 20%, by volume, of the total volume of said gaseous mixture. The purity of the gases is approximately 99% or more. The adsorbed gases are removed from the inner surface of the glass container prior to deposition of the layers of material by exposure to a high vacuum (very low pressure) while heating the outside surface of the container. The inner surface of the glass container is generally spherical in configuration.

22 Claims, 4 Drawing Sheets

CAPACITOR

TECHNICAL FIELD

This invention relates to a novel capacitor formed within a sealed hollow glass container including inductor means and a gaseous mixture of various noble gases.

BACKGROUND ART

The use of the noble gases in low pressure electric discharge tubes, and at very low pressures in electrodeless glow lamps, is well known. For example, mixtures of the noble gases can provide metastable electronic states of the atoms permitting reduction of the required break-down voltage to accommodate low-voltage electrical discharges. Also, by changing the relative abundance of the noble gases in the mixture, the color of the discharge can be varied, since both the partial pressures of the gases and the respective energy differences between their ground states and lowest excited states will determine the color observed at a given discharge potential. At higher pressures, the noble gases become increasingly insulating, requiring higher discharge potential, although at very high pressures (>60 atmospheres) they become more conductive.

Capacitors employing gases at relatively high pressures as a dielectric, and inductors are also known in the art. However, the invention described herein represents a new form of this technology, in which the inductor means is intrinsically part of a capacitor designed to effect oscillating or pulsed discharges across its internal dielectric.

DISCLOSURE OF INVENTION

A capacitor comprising a sealed hollow glass container, inductor means having a portion thereof mounted within said sealed glass container coated with gold, an outermost layer of material selected from one of a group of high purity (99% or more and preferably 99.7% or more) elements consisting of gold, titanium, niobium and selenium deposited over the portion of the inductor means located within the glass container and the inner surface of said glass container, an innermost layer of titanium of high purity (99% or more and preferably 99.7% or more) deposited over the exposed surface of said outermost layer, and a gaseous mixture of high purity (99.9% or more and preferably 99.99% or more) of noble gases filling said sealed glass container having a pressure, at 25° C., of approximately 100 torr or more. Adsorbed gases are substantially removed from the exposed portion of the inductor means located with the glass container and the inner surface of said glass container prior to the deposition of the outermost layer of material by exposure thereof to a vacuum pressure that reaches approximately $1 \times 10^{-6}$ torr or lower and, during the latter part of said evacuation, at a temperature of approximately 100° C. or more. The gaseous mixture is selected from a group of high purity gases consisting of helium, neon, argon, krypton and xenon. The amount of argon, neon and xenon does not, individually, exceed approximately 50%, by volume, of the total volume of said gaseous mixture. The amount of helium varies from approximately 10% to 90%, by volume, of the total amount of said gaseous mixture. The amount of krypton does not exceed approximately 20%, by volume, of the total amount of the gaseous mixture. The sealed glass container is preferably generally spherical in configuration. The metal layers are capable of storing, with safety, a high static charge that is periodically discharged (at least in part), upon ionizing the gases in the mixture, through the gaseous mixture. Upon discharge of the electrical charge stored in the metal layers, current flows from the inductor means to the metal layers and recharges same. This, in turn, causes oscillating electric and magnetic fields which produce a system that has several resonant frequencies, and which has been found to be beneficial in creating an environment for meditation. Although never measured, it is believed from theory that the system resonates chiefly in the megahertz range. However, a spectrum of lower resonant frequencies, presumably in the very low (VLF) and extremely low (ELF) ranges are expected due to Townsend-discharge and various sheet-resistance and surface effects associated with the structure of the deposited layers and pressures and composition of the gaseous mixture in the container.

BRIEF DESCRIPTION OF DRAWINGS

The details of this invention will be described in connection with the accompanied drawings, in which.

DETAILED DESCRIPTION

Figure 1:
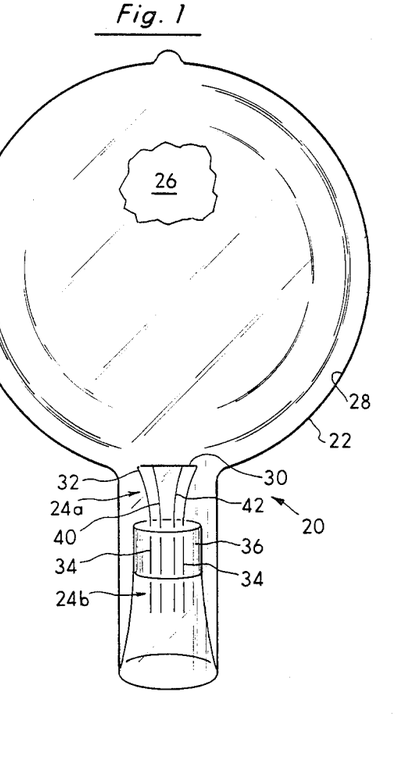
FIG. 1 is a vertical elevational view, in partial cross-sectional, of one embodiment of a capacitor constructed in accordance with this invention.

Referring to the drawings, in FIG. 1 is shown a capacitor 20 comprising a sealed hollow glass container 22, and a gaseous mixture 26 filling said container 22. The inner surface 28 of the sealed hollowed glass container 22 is preferably generally spherical in configuration. The volume of the sealed hollow glass container 22 may vary; capacitors have been made with volumes between 2 and 12 liters. For individual use, capacitors between 3 and 5 liters have been found to be quite useful in creating an environment for meditation. It is believed that capacitors having a volume up to approximately 50 liters would work very well, particularly for creating an environment for group meditation.

The sealed hollow glass container 22 is preferably formed from a borosilicate glass (e.g., Pyrex ® #7440, Corning Glass Co. or Kimax ®, Kimble Glass Co.). This type of glass contains no lime, little soda and potash, about 12% boron oxide, and has a high chemical resistance and a low coefficient of expansion. Alternatively, the container 22 may be made from fused quartz or any glass which has been treated (e.g., with acid) to remove its sodium and boron oxide content so that the resulting glass has a silica ($S_iO_2$) content of 95% or greater (e.g., Vycor ®, Corning Glass Co.). Substantially all the adsorbed gases (particularly reactive gases) are removed from the inner surface 28 thereof before any layers of materials are vacuum deposited on the inner surface 28. In this context, reactive gases and materials include any substance which has a significant vapor pressure (i.e., greater than 0.001 millitorr or $10^{-6}$ torr) at room temperature and possess a significant electric and/or magnetic field external to the atom. The latter corresponds to any gas which doesn't have a spherical distribution of electronic charge about the nucleus due to incomplete filling of electron subshells and/or by the existence of unpaired electrons in the outer valence shell. Examples of such reactive gases are oxygen, hydrogen, nitrogen, water vapor, carbon monoxide and carbon dioxide.

The inductor means 24 of the capacitor 20 has a portion 24a mounted within said sealed hollow glass container 22 and a portion 24b extending outside of said sealed hollow glass container. As shown in FIG. 1, the inductor means 24 includes a generally (inverted) U-shaped wire element 30 in which the bight 32 thereof is mounted within said sealed hollow glass container 22. Portions 34 of the U-shaped wire element 30 extending from the bight 32 and are sealed to and extend through the glass seal 36 which is mounted within the neck or opening 38 originally formed in the container 22. As shown, the glass seal 36 is, itself, sealed to the walls of the opening 38 to effect a gas-tight (hermetic) seal between the walls of the opening 38 and the glass seal 36. Preferably, the glass seal 36 is formed from a uranium-glass material which, due to the existence of the uranium, emits a very weak ionizing radiation into the sealed glass container. The amount of ionizing radiation emitted into the sealed glass container is equivalent to approximately two to four times the rate of normal "background" ionizing radiation. No ionizing radiation can be detected outside the sealed glass container.

The inductor means also includes wire elements 40 and 42 disposed generally parallel to the ends 34 of the U-shaped wire element 30 but spaced apart from said ends 34. Portions of these wire elements are sealed to the uranium glass seal 36. The bight 32 of the U-shaped wire element 30 is formed from nickel electroplated with 24k gold. The lower portions of ends 34, which pass through and are fused in the uranium glass seal 52, and the equivalent lower portions of wire elements 40 and 42 are formed from tunsten.

Figure 5:
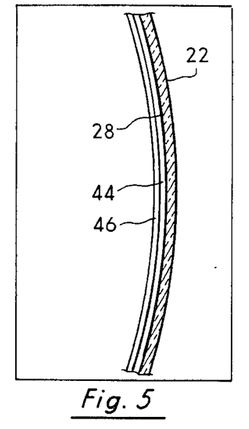
FIG. 5 is a cross-sectional view of a portion of a sealed glass container and two vacuum deposited layers on the inner surface thereof.

Referring now to FIG. 5, the capacitor includes two or more layers of material sequentially deposited over the inner surface 28 of the glass container 22. The outermost layer 44 (deposited on the inner surface of the container) is selected from one of a group of elements consisting of gold, titanium, niobium and selenium. The purity of selenium, titanium, gold and niobium is 99% or more and preferably 99.7% or more. The innermost layer 46 is formed from titanium having a purity of 99% or more and preferably 99.7% or more. Where more than two layers of material are so deposited, the final or innermost layer is always formed from titanium having a purity of 99% or more and preferably 99.7% or more. Where the outermost layer is formed from gold, it may be sufficiently thin as to be semi-transparent; it may be only approximately thirty to forty atoms thick. The use of such a thin layer results in a saving in gold without adversely affecting the operation of the capacitor. The innermost layer of titanium is made substantially thicker than the outermost layer of gold; preferably it is at least twice as thick. As shown in FIG. 5, two layers 44 and 46 suffice to make a capacitor that will create an environment conductive to meditation. The innermost layer 46, in addition to receiving and storing an electrical charge, also functions as a "getter", i.e., during deposition to remove reactive gases which might otherwise be present.

The gaseous mixture 26 filling the sealed glass container 22 has a total pressure, at 25° C., of approximately 100 torr or more. The total pressure, at 25° C., may vary between approximately 100 torr and 2000 torr. Generally, the upper pressure does not exceed approximately 1000 torr. It has been found desirable to use a pressure between approximately 600 torr and 1 atmosphere, i.e., 760 torr.

The gases in the gaseous mixture 26 are selected from a group of gases consisting of helium, neon, argon, krypton and xenon. The amounts of argon, neon and xenon do not, individually, exceed approximately 50%, by volume of the total volume of said gaseous mixture. The amount of helium contained within said gaseous mixture varies from approximately 10% to 90%, by volume, of the total volume of the gaseous mixture. The amount of krypton does not exceed approximately 20%, by volume, of the total volume of said gaseous mixture. The purity of the gases used to fill the container 22 is approximately 99.9% or more and preferably 99.99% or more. In order to protect the electrical properties of the gaseous mixture and of the deposited layers which are thought to be conductive to meditation, it has been found necessary to eliminate or keep to an absolute minimum in the gaseous mixture any reactive volatile substances.

The inner surface 28 of the sealed glass container 22 is subjected to extremely low vacuum pressures and elevated temperatures for a relatively long period of time in order to remove adsorbed gases from said inner surface before depositing the first or outermost layer of material 44 over the portion 24a of the inductor means located within the glass container 22 and the inner surface 28 of the glass container. This is achieved by rough-pumping from atmospheric pressure down to approximately 100 millitorr pressure then warming the container 22 slowly to approximately 80° to 100° C. with continued pumping. When the system pressure approaches 10 millitorr, the diffusion pump 140 (see FIG. 7) of the vacuum system is engaged and the container 22 is evacuated to a pressure of approximately $1 \times 10^{-5}$ torr. The outside of the container 22 is then brushed with a bushy flame of a hand-torch to elevate the temperature thereof to approximately 300° C. in order to out-gas the inner spherical surface. When this is done, the pressure increases rather abruptly to $>1 \times 10^{-4}$ torr and then slowly decreases to $5 \times 10^{-6}$ torr. The pure metal wire elements 40 and 42 are suitably connected to a source of electricity and brought to incandescence briefly to remove adsorbed gases. The process of brushing the container 22 with the hand held torch is continued until the pressure is reduced to approximately $2 \times 10^{-6}$ torr. The entire container 22 is then wrapped with heating tape (not shown) and evacuation is continued for several days at a temperature between 80° to 150° C.

Figure 2:
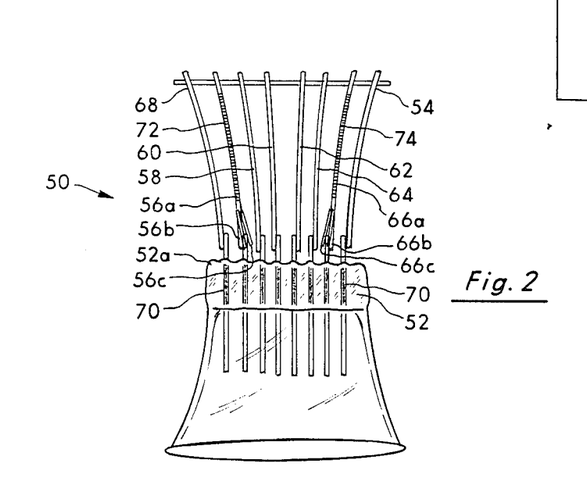
FIG. 2 is a vertical elevational view of an inductor means and materials to be vacuum deposited on the exposed surfaces within said sealed glass container.

Referring now to FIGS. 2-4 and 6, FIGS. 2-4 show additional embodiments of inductor means as other examples of that which may be used to manufacture a capacitor in accordance with this invention. In FIG. 2 the inductor means 50 comprises a uranium glass seal 52, a U-shaped wire element 54, and a plurality of wire elements 56–66. The bight 68 of the U-shaped wire element 54 is formed from nickel (gold plated). The lower portions of ends 70 of the U-shaped wire element 54 and the equivalent lower portions of wire elements 56–66 are formed from tungsten. One of the upper ends of the wire elements 56–66, such as 58a, may be formed from niobium having a purity of 99% or more and preferably 99.7% or more. As shown, wire elements 56 and 66 are spirally wrapped with gold wires 72 and 74. As shown, the upper ends 56a and 66a of the wire elements 56 and 66 are connected to a pair of short wire elements 56b, 56c and 66b, 66c. In turn, the wire elements 56b, 56c and 66b, 66c are secured to that (tunsten) portion of the wire elements 56 and 66 that extends above the upper surface 52a of the uranium glass seal. The spaced apart wires 56b, 56c and 66b, 66c form a notch or wedge to retain the gold while as it melts during vacuum deposition.

Where several layers of metal, i.e., gold, titanium and/or niobium, are sequentially deposited, it may be desireable to use a dielectric to separate such layers. One such dielectric is selenium having a purity of 99% or more and preferably 99.7% or more. One of the wire elements 58–64 (and two such wire elements where two separate layers of selenium are required) is coated with selenium. Powdered selenium, preferably passing a 325 mesh screen, is placed in a crucible. The crucible is heated in an oxygen free environment (i.e., done in an argon atmosphere) and the selenium is melted. The titanium (or niobium) wire is passed through the molten selenium once or twice thereby coating the wire with selenium. When a layer of selenium is to be deposited over the exposed portion of the inductor means located within the sealed glass container and the exposed layer of material previously deposited on the inner surface of said glass container, the temperature of the titanium (or niobium) wire on which the selenium is coated is increased to melt the selenium which, upon melting, is vacuum deposited to form a layer of selenium covering the exposed surfaces inside the glass container.

As shown in FIG. 2, the wire elements 55–66 preferably do not contact the nickel wire at right angles; rather, each of the wire elements curve outwardly as shown in FIG. 2 and contact the horizontal extending portion of the U-shaped wire element 54 at an acute angle. The purpose of this is to reduce the stresses that otherwise would exist in the wire elements 56–66 when said wire elements are heated to effect vacuum deposition of the titanium or niobium wire elements or the gold or selenium wrapped or coated thereon.

Figure 3:
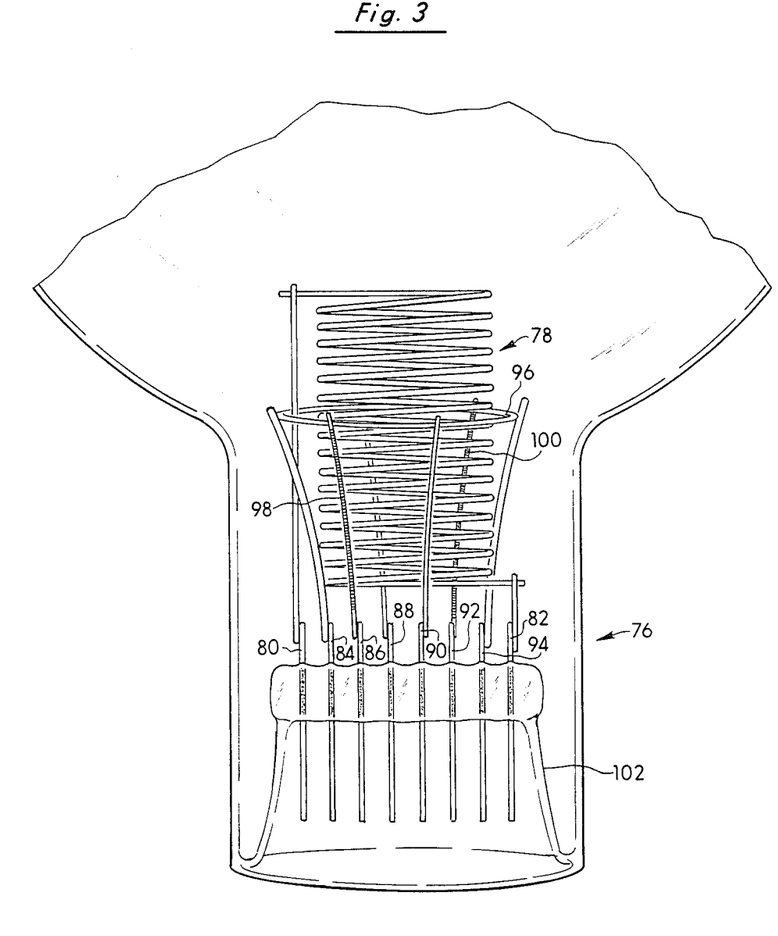
FIG. 3 is a preferred embodiment of an inductor means constructed in accordance with this invention for a larger size capacitor, i.e., five to twelve liter volume.

In FIG. 3 is shown a preferred embodiment of the inductor means 76 for use in a capacitor constructed in accordance with this invention. As shown in FIG. 3, the inductor means includes a coiled portion 78 electrically connected to the outer wire elements 80 and 82. The wire elements 84–94 have upper portions thereof electrically connected to an annular member 96. The upper portions of wire elements 86 and 92 are wrapped, respectively, with gold wires 98 and 100. The upper portion of wire element 88 and/or 90 may be coated with selenium, and one or more of the upper portions of wire elements 86–92 may be formed from niobium rather than titanium. Except for the use of the coiled portion 78 and the use of the annular member 96, the inductor means shown in FIG. 3 is similar in overall operation to the inductor means 50 shown in FIG. 2. The inductor means 76 includes a uranium glass seal 102.

Figure 4:
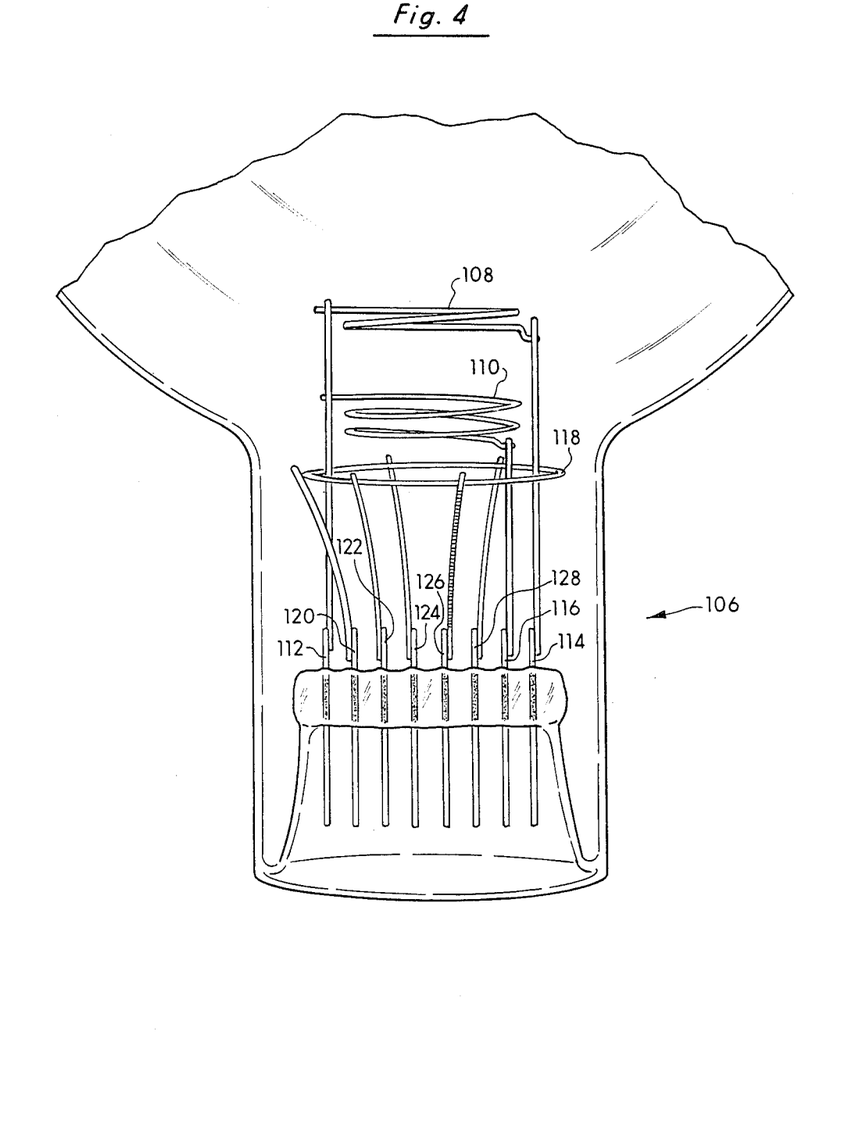
FIG. 4 is an additional embodiment of an inductor means constructed in accordance with this invention.

In FIG. 4 is shown a fourth embodiment of an inductor means 106. Inductor means 106 includes two coil portions 108 and 110. Coil portion 108 is connected to the upper portions of wire elements 112 and 114. Coil portion 110 is connected to the upper portion of wire elements 112 and 116. The inductor means 106 of FIG. 4 also uses an annular member 118 which is attached to the upper portions of wire elements 120–128. One or more of the upper portions of the wire elements 122–128 may be suitably wrapped with a gold wire (not shown) as was done for the inductor means 76 of FIG. 3. One or more of the remaining upper portions of the wire elements (i.e., those not wrapped with a gold wire) may be coated with selenium as described with respect to inductor means 76 of FIG. 3. Up to three of the upper portions of wire elements 122–128 may be formed of niobium rather than titanium.

The use of various one or two coil portions rather than a U-shaped wire element facilitates the selection of predetermined resonant frequencies for the capacitor.

The bight 32 of the U-shaped wire element is formed from nickel electroplated with 24k gold. The upper portions of wire elements 40 and 42 are formed from titanium or niobium having a purity of 99.9% or more and preferably 99.99% or more.

Figure 6:
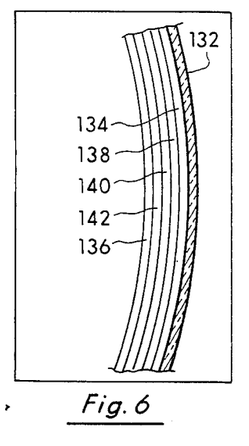
FIG. 6 is a cross-sectional view of a portion of another sealed glass container having a plurality of vacuum deposited layers on the exposed inner surface.

Referring now to FIG. 6, the container 132 includes two or more layers of material sequentially deposited on the inner surface of container 132. The outermost layer 134 is formed from a material selected from a group of elements consisting of gold, selenium, niobium and titanium. The innermost layer 136 is formed from titanium. The three intermediate layers 138–142 may, for example, be formed from titanium for layer 138, selenium for layer 140, and gold for layer 142, see capacitor No. 14 in Table 1 below.

Figure 7:
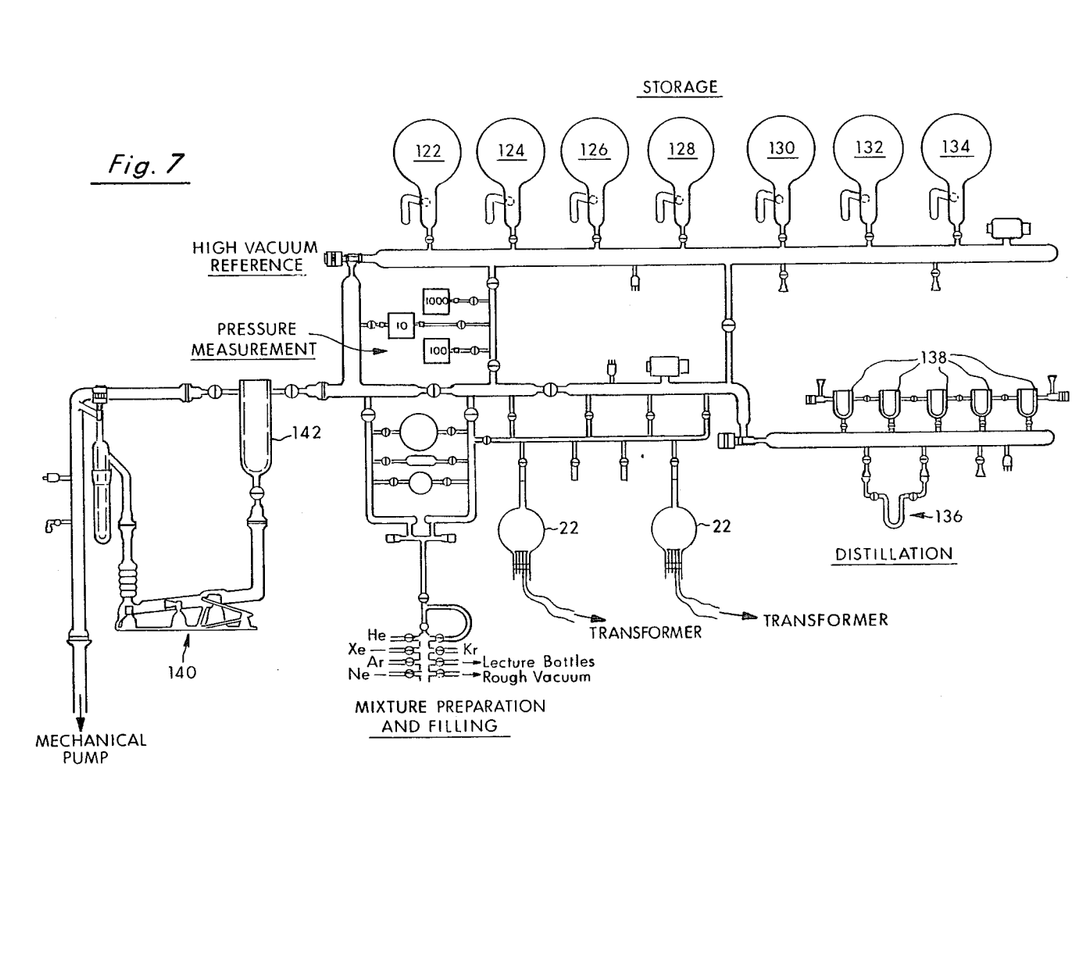
FIG. 7 is a schematic view of a vacuum system used to produce the capacitor of this invention.

FIG. 7 shows a vacuum system used to manufacture the capacitor of this invention. Central to this system is a multi-functional, gas-handling system, capable of reaching a high vacuum, i.e., less than $5 \times 10^{-7}$ torr, and free of contaminating trace substances, e.g., reactive gases. The vacuum system comprises five sections: (1) storage, (2) a high-vacuum reference, (3) pressure measurement, (4) mixture preparation and filling, and (5) distillation. As shown in FIG. 7, said vacuum system is constructed to manufacture four capacitors at the same time. However, it will be understood that the vacuum system can be modified to handle five or more capacitors at the same time.

The storage section of the vacuum system comprises a series of 5000 ml glass storage bulbs 122–134, equipped with cooling stems to permit purification or distillation of the contents of the bulbs. The pressure measurement section includes a 170M-25C MKS Baratron TM capacitance manometer equipped with 1, 10 and 1000 torr heads, and by several thermocouple and Bayard-Alpert (ionization) gauges distributed over the length of the vacuum line. Gases are introduced either by attaching glass bulbs of the desired gases directly to the system (via size 15 O-ring joints) or by opening the appropriate bellows-valve of a small manifold at the base of the section of the vacuum line reserved for mixture preparation and filling.

The distillation section of the vacuum system includes a combination of U-tube traps (e.g., 136) and dewar type traps 138 to be immersed in and contain, respectively, liquid nitrogen or other low-temperature baths. The traps facilitate a thermally staged, serial distillation (purification) of the gases to be used in a capacitor constructed in accordance with this invention. The vacuum system is pumped by a three-stage, glass, oil (Octoil) diffusion pump 140 backed by a Welch, "Duo-Seal" mechanical pump (3000 liters per minute), not shown. To protect the system from possible contamination by back-streaming oil vapor, a flow-through cold trap 142 is included in the connecting line to the intake of the diffusion pump 140. All valves are greaseless, Teflon ® (or Kel-F ®) type with Viton ® O-rings (Kontes, bore: 0–5 through 0–20 mm).

In preparing a capacitor constructed in accordance with this invention, a "glass-blower's blank", preferably a round-bottom boiling flask of high quality borosilicate glass, is selected. Where a three-liter flask is involved, the diameter is about 18 cm. The neck of the flask is flame-cut on a lathe to extend approximately 7.5 cm from the outer diameter of the container. The diameter of the neck is approximately 5 cm. A 9 mm diameter (20 cm length) medium wall Pyrex ® glass tube is fused into the wall of the container at a point opposite to the position of the neck to serve as an evacuation/filling stem when attached to the vacuum line. A uranium-glass to Pyrex ® glass press-seal is constructed by securing several tungsten electrodes (1.0 to 1.5 mm diameter) in a drilled carbon rod (not shown) over which is placed a uranium glass tube. The uranium glass tube is heated above the softening point and allowed to collapse and fuse to and around the tungsten electrodes. The carbon rod is removed and the cup-shaped base of the seal is flared on the lathe to the diameter of the neck of the container. After annealing the press seal, the tungsten wires are cut at both ends so as to extend approximately 0.7 cm above the top of the seal, and (on the underside) not beyond the opening of the flared base. Two 1–1.5 mm diameter nickel rods are spot-welded to the outer left and right tungsten posts above the seal (which is to become part of the interior of the capacitor) and a third nickel rod is welded to the top of the two nickel rods to form a bridge, see FIG. 2. Titanium and niobium wires (~0.8 mm in diameter) and titanium (or niobium) wires wrapped with pure gold wire or coated with selenium, are spot welded across the spaces between the remaining posts and the top of the inverted U-shaped wire element. The wire elements that will be located within the glass container 22 are dipped in a gold-plating solution ("Orosene ® 999") and the metal (nickel) parts of the inductor means are gold plated. The previously prepared container 22 is mounted on a lathe in line with the inductor means and the two are fused at the end of the neck of the container. The assembled unit is then annealed at 555° C. and cooled to room temperature overnight. Alternatively, if filaments coated with selenium are included in the inductor means, the glass container 22 may be prepared and annealed prior to installation of the inductor means (press seal). The cooled container and inductor means are then assembled on a lathe using a hand torch to carefully fuse and locally anneal the glass along the seam of the joined parts so as to avoid volatilization of the selenium. Similar precautions with regard to preventing premature evaporation or other loss of any selenium coating on wire elements of the inductor means are observed throughout the following construction of the capacitor and especially when elevated temperatures are employed.

The annealed container is filled (by thermal expansion of the air and subsequent suction of the liquid through the evacuation stem) with a dilute solution of hydrofluoric acid in distilled water, rinsed with distilled water and then filled with approximately two liters of gold-plating solution, and an additional layer of gold is plated onto the metal parts of the inductor means. The container is further rinsed with distilled water, followed by acetone, and then methylene chloride, and dried by connecting it (with the 9 mm stem pointing downward) to a laboratory aspirator. The dried container is attached to the vacuum line by fusing (glass blowing) the open end of the evacuation tube to the glass stem of a valve on the vacuum system.

The adsorbed gases are then removed from the exposed metal parts of the inductor means and the inner surface of the container in the manner already described.

Within approximately two to three days, the vacuum line, including the capacitor 20 will reach a pressure of less than $\sim 1 \times 10^{-6}$ torr. At that time, the heating tape is removed from the capacitor; the outside surface of the glass container is again brushed with a hand-torch flame and allowed to cool to approximately 80° C. The wire elements to be sublimated are connected again to a tandem of variable transformers (not shown) and sublimated sequentially by resistive heating. Usually the first element to be sublimated is the gold wire, i.e., wire 72 as shown in FIG. 2, wrapped on a titanium (or niobium) wire, i.e., wire element 56a shown in FIG. 2. Electricity is supplied to the wire element 56 until the gold wire 72 liquifies and flows to the "wedge" shaped point formed by portions 56b and 56c. The sublimation process is continued until a semitransparent thin layer of gold (pale purple/pink to gold in color) has been deposited over the portion of the inductor means located within the container 22 and the inner surface of the container 22. Next, wire element 58 (which may be either titanium or niobium) is brought to incandescence by resistive heating and a layer of this metal is deposited over the layer of gold. Next, a layer of selenium may be deposited over the layer of titanium or niobium by resistive heating of wire element 60 coated with selenium. Another layer of gold may be deposited as before, followed by a heavy layer of titanium. This process may be repeated to produce a laminated sequence of layers of material over the preceding layer of material to create parallel layers of the aforesaid metals to receive and store an electrical charge. However, it must be kept in mind that the innermost layer deposited is always titanium since this substance is employed as a "getter" of active material to adsorb any reactive gases which may be present during deposition and could later contaminate the noble gas mixture added to the container.

Following the vacuum deposition of the layers of material as aforesaid, the container is now ready to be filled with a mixture of noble gases of high purity. The noble gases used consist of krypton, xenon, neon, helium and argon. The purity of these gases is at least 99.9% and preferably 99.99% or higher. A purity of 99.995% for these gases was achieved or maintained with additional purification on the vacuum line. Filling of the glass container with these gases is accomplished by adding each gas sequentially to the container at the required partial pressure plus the total gas pressure in the container achieved when the previous gas was added. The ambient temperature taken as the temperature of the container is monitored and the actual pressure read from the capacitance manometer (10 and 100 torr heads) is adjusted to the temperature observed when the last gas is added. The container is then immediately sealed by fusion of the glass evacuation stem just above the top surface of the container, see FIG. 7, and the seal is annealed with the flame of a hand-torch so as not to introduce stress into the body of the sphere.

Capacitors of different sizes containing different combinations of metal layers, different mixtures of gases and different inductor means have been made. The capacitors are described in Table 1 below.

TABLE 1

| Capacitor | Size (Liter) | Layers of Material Innermost to Outermost | Gaseous Mixture (%) | | | | |
|---|---|---|---|---|---|---|---|
| | | | Ar | He | Xe | Kr | Ne |
| 1 | 2 | Ti—Ti | 0 | 72 | 13 | 0 | 15 |
| 2 | 2 | Ti—Ti | 48 | 40 | 0 | 0 | 12 |
| 3 | 3 | Ti—Au—Ti | 7 | 44 | 26 | 3 | 20 |
| 4 | 3 | Au—Ti—Au—Ti | 17 | 50 | 15 | 3 | 15 |
| 5 | 2 | Ti—Au—Ti—Ti | 8 | 60 | 15 | 3 | 14 |
| 6 | 2 | Au—Ti—Ti | 9 | 73 | 0 | 18 | 0 |
| 7 | 3 | Au—Ti—Ti | 23 | 54 | 11 | 3 | 8 |
| 8 | 2 | Au—Ti—Nb—Au—Ti | 8 | 60 | 15 | 3 | 14 |
| 9 | 3 | Au—Ti—Au—Ti | 10 | 41 | 26 | 3 | 20 |
| 10 | 3 | Au—Ti—Nb—Ti | 20 | 49 | 10 | 6 | 15 |
| 11 | 3 | Au—Nb—Ti—Se—Au—Ti | 29 | 40 | 12 | 3 | 16 |
| 12 | 12 | Ti—Au—Ti | 32 | 35 | 15 | 2 | 16 |
| 13 | 3 | Au—Ti—Nb—Au—Ti | 15 | 46 | 16 | 4 | 16 |
| 14 | 3 | Au—Ti—Se—Au—Ti | 30 | 36 | 16 | 6 | 12 |
| 15 | 3 | Au—Ti—Nb—Au—Ti | 30 | 28 | 20 | 4 | 18 |
| 16 | 3 | Au—Ti—Au—Ti—Ti | 16 | 56 | 12 | 2 | 15 |
| 17 | 3 | Au—Ti—Se—Au—Nb—Ti | 24 | 36 | 13 | 5 | 22 |
| 18 | 3 | Ti—Se—Au—Ti | 30 | 52 | 0 | 18 | 0 |

From the foregoing, it will be observed that various mixtures of gases can be used. Table 2 shows the various mixtures of gases that can be used to manufacture a capacitor in accordance with this invention.

TABLE 2

| | Mixture of Gases By Volume, 25° C. | | |
|---|---|---|---|
| Gases | Good Result | Preferred | Optimum |
| Argon | 0–50% | 10–35% | 20–35% |
| Helium | 10–90% | 30–60% | 40–55% |
| Xenon | 0–50% | 10–35% | 20–30% |
| Krypton | 0–20% | 0–10% | 0–5% |
| Neon | 0–50% | 10–35% | 10–20% |

It has been found that the purity of the gases used in the gaseous mixture should be approximately 99.9% or higher and preferably 99.99% or better. When the gases are additionally purified on the vacuum line, it has been found that a minimum purity of 99.995% is achieved.

Operation of a capacitor constructed in accordance with this invention is now described. A static charge is built upon the metal layers formed on the exposed surfaces of the inductor means located within the sealed glass container and the inner surface of said sealed glass container. This may be done by rubbing the exterior of the sealed glass container with the hand, with wool or a with piece of fur. For the transfer of energy within the device, the electric charge (electric field) in the layers of material deposited on the internal surface is inversely related to the magnetic field produced in the inductive means.

When the metal layers have received a sufficient electrical charge, one or more of the gases in the mixture become ionized thereby resulting in a transfer of charge from the metal layers through the gaseous mixture. At the same time, there is an increase in the magnetic field of the inductor means; as a result, the amount of charge on the metal layers is first diminished after a discharge, and subsequently restored partially by recharging from the magnetic field of the inductor means as it is reduced to its former amount. Since the capacitor is charged initially both passively (by the movement of air past the external surface of the sealed glass container) and actively (by rubbing the sealed glass container with wool, fur or by hand), and since the use of noble gases as aforesaid effects a discharge of the metal layers with subsequent recovery of the electrical energy through oscillation, the capacitor constructed in accordance with this invention will resonate or oscillate at frequencies which may be selected or predetermined by the relationship of the inductor means to the capacitor and by other intrinsic properties of the capacitor such as surface geometry and resistance. The spherical shape is considered important to maintain constant physical parameters for discharge over the entire internal surface. For example, it is thought that a prolate or oblate spheroid shape for the container would be detuning and hence detrimental to the desired frequency response of the device.

The oscillation of electrical energy within the system can be extended for a period of time without or with only minimal rubbing of the external surface of the sealed glass container with wool, fur or by hand. Where a weak ionizing radiation source is also incorporated into the capacitor constructed in accordance with this invention, it has been found that the transmission of ionizing radiation into the gaseous mixture reduces the break-down potential of the gases and assists the capacitor in extending the duration of its electrical oscillations without supplementing restoration of the electrical charge by rubbing the external surface of the container as aforesaid.

Although the present invention has been described with a certain degree of particularity, it is understood that the present disclosure has been made by way of example and that changes in detail of structure and materials may be made without departing from the spirit thereof.

I claim:
1. A capacitor comprising:
   a. a sealed hollow glass container;
   b. inductor means, a portion of which is mounted within said sealed glass container;
   c. an outermost layer of material is selected from one of a group of materials consisting of gold, titanium, niobium and selenium, having a purity of approximately 99% or more, deposited over the portion of the inductor means located within said glass container and the inner surface of said glass container, and an innermost layer of titanium, having a purity of approximately 99.7% or more, deposited over the exposed surface of said outermost layer;
   d. a gaseous mixture filling said sealed glass container, said gaseous mixture having a pressure, at 25° C., of approximately 100 torr or more, the gases in said mixture being selected from a group of gases consisting of helium, neon, argon, krypton and xenon in which the amount of argon, neon and xenon does not, individually, exceed approximately 50%, by volume, of the total volume of said gaseous mixture, the amount of helium varies from approximately 10% to 90%, by volume, of the total volume of said gaseous mixture and the amount of kyrpton does not exceed approximately 20%, by volume, of the total volume of said gaseous mixture, the purity of said gases being approximately 99.9% or more;

e. the inner surface of said glass container having adsorbed gases substantially removed therefrom prior to the deposition of the outermost layer by exposure to a vacuum pressure that reaches approximately $1 \times 10^{-6}$ torr or lower and, during the latter part of said evacuation, at a temperature of approximately 80° C. or more.

2. A capacitor as described in claim 1 in which said inductor means includes a generally U-shaped wire element and wire elements spaced apart from said U-shaped wire element, the bight of said U-shaped wire element being located within said sealed glass container, said inductor means having portions thereof sealed to and extending through a portion of said glass container.

3. A capacitor as described in claim 2 in which said generally U-shaped wire element of said inductor means includes a coil portion mounted within said sealed glass container.

4. A capacitor as described in claim 1 in which said inductor means includes a coil portion mounted within said sealed glass container and portions extending away from said coil portion in a direction generally parallel to the longitudinal axis of said coil portion through a portion of said glass container and sealed to said glass container, and wire elements located adjacent said coil portion but spaced apart therefrom.

5. A capacitor as described in claim 1 including means for emitting ionizing radiation at a rate up to approximately four times normal background rate for ionizing radiation into said gaseous mixture.

6. A capacitor as described in claim 5 in which said ionizing radiation means includes a uranium glass portion disposed in ionizing radiation communication with the interior of said sealed glass container.

7. A capacitor as described in claim 6 in which said inductor means extends through and is sealed to said uranium glass.

8. A capacitor as described in claim 1 in which said inductor means includes first and second coil portions, each coil portion having ends extending generally parallel of the longitudinal axis of said coil portions and through said sealed glass container and sealed to said glass container, and wire elements mounted adjacent said coil portions but apart therefrom.

9. A capacitor as described in claim 1 in which the amount of argon varies from approximately 10% to 35%, by volume, of the total amount of said gaseous mixture, the amount of neon varies from approximately 10% to 35%, by volume, of the total amount of said gaseous mixture, the amount of krypton does not exceed approximately 10%, by volume, of the total amount of said mixture, the amount of helium varies from approximately 30% to 60%, by volume, of the total volume of said gaseous mixture, and the amount xenon varies approximately 10% to 35% by volume, of the total amount of said gaseous mixture.

10. A capacitor as described in claim 1 in which the amount of argon varies from approximately 20% to 35%, by volume, of the total amount of said gaseous mixture, the amount of neon varies from approximately 10% to 20%, by volume, of the total volume amount of said gaseous mixture, the amount of xenon varies from approximately 20% to 30%, by volume, of the total amount of said gaseous mixture, the amount of helium varies from approximately 40% to 55%, by volume, of the total amount of the gaseous mixture and the amount of krypton does not exceed approximately 5%, by volume, of the total amount of said gaseous mixture.

11. A capacitor as described in claim 1 in which the inner surface of said sealed glass container is generally spherical in configuration.

12. A capacitor as described in claim 11 in which said sealed glass container is formed from borosilicate glass.

13. A capacitor as defined in claim 12 in which said outermost layer is formed from gold and is approximately thirty to forty atoms thick.

14. A capacitor as defined in claim 1 in which said outermost layer is formed from gold that is semi-transparent.

15. A capacitor as described in claim 1 including first, second and third intermediate layers of material, said first intermediate layer being formed from titanium, having a purity of approximately 99% or more, deposited over the outermost layer of material, said second intermediate layer being formed from niobium, having a purity of 99% or more, deposited over said first intermediate layer of titanium, said third intermediate layer being formed from gold, having a purity of 99% or more, deposited over said second intermediate layer of niobium, said innermost layer of titanium being deposited over said third intermediate layer of gold.

16. A capacitor as described in claim 15 in which the amount of argon, by volume, equals approximately 15% of the total volume of said gaseous mixture, the amount of neon, by volume, equals approximately 16% of the total volume of said gaseous mixture, the amount of xenon, by volume, equals approximately 16% of the total volume of said gaseous mixture, the amount of krypton, by volume, equals approximately 4% of the total volume of said gaseous mixture and the amount of helium, by volume, equals approximately 46% of the total volume of said gaseous mixture.

17. A capacitor as described in claim 16 in which the inner surface of said sealed glass container is generally spherical in configuration.

18. A capacitor as described in claim 15 in which the amount of argon, by volume, equals approximately 29% of the total volume of said gaseous mixture, the amount of neon, by volume, equals approximately 16% of the total volume of said gaseous mixture, the amount of xenon, by volume, equals approximately 12% of the total volume of said gaseous mixture, the amount of krypton, by volume, equals approximately 3% of the total volume of said gaseous mixture and the amount of helium, by volume, equals approximately 40% of the total volume of said gaseous mixture.

19. A capacitor as described in claim 18 in which the inner surface of said sealed glass container is generally spherical in configuration.

20. A capacitor as described in claim 1 including first, second, third and fourth intermediate layers of material, said first intermediate layer being formed from niobium, having a purity of approximately 99% or more, deposited over the outermost layer of material, said second intermediate layer being formed from titanium, having a purity of 99% or more, deposited over said first intermediate layer of niobium, said third intermediate layer being formed from selenium, having a purity of 99% or more, deposited over said second intermediate layer of selenium, said fourth intermediate layer being formed from gold, having a purity of 99% or more, deposited over said third intermediate layer of selenium, said innermost layer of titanium being deposited over said fourth intermediate layer of gold.

21. A capacitor as described in claim 1 in which the outermost layer of material is selected from one of a group of materials consisting of gold, niobium and selenium having a purity of approximately 99% or more, deposited over the portion of the inductor means located within said glass container and the inner surface of said glass container.

22. A capacitor as described in claim 21 in which the outermost layer of material is formed from gold.

* * * * *